Oct. 29, 1957  A. T. FUSCHI  2,811,374
TRACTOR-TRAILER KING-PIN LOCK SAFETY MEANS
Filed March 28, 1955  3 Sheets-Sheet 1
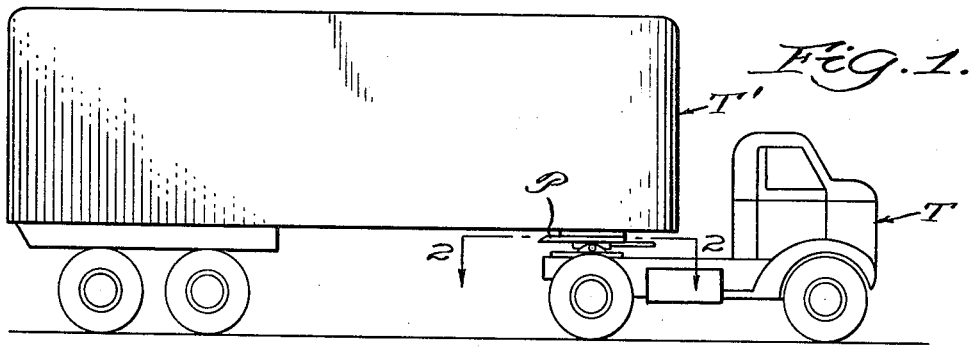
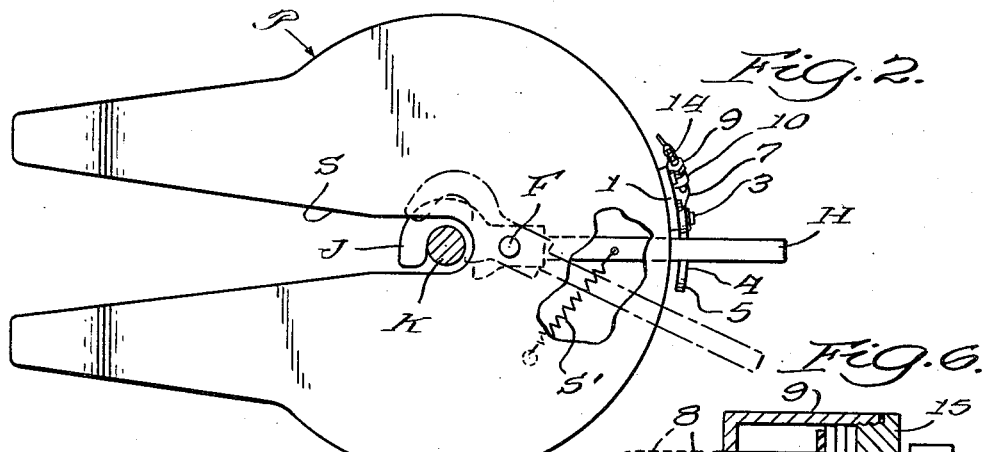
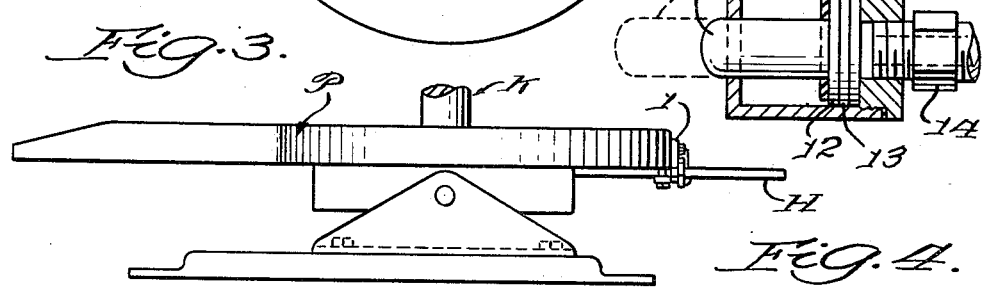
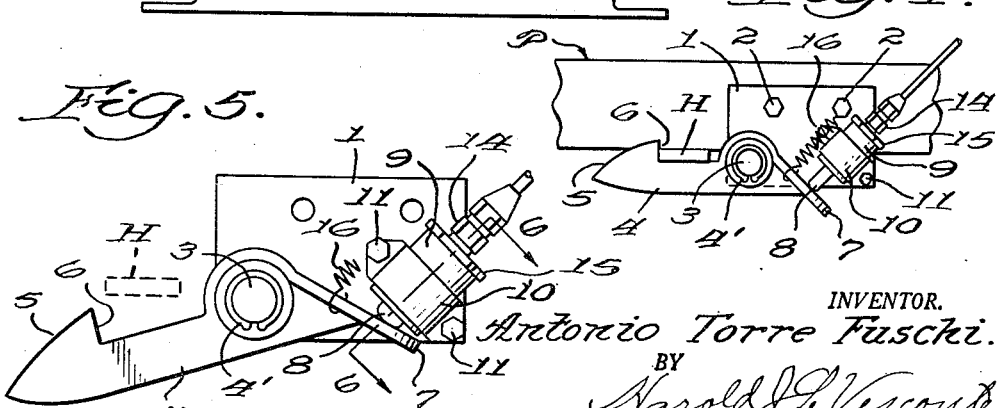
INVENTOR.
Antonio Torre Fuschi.
BY
Harold J. L. Visconte
Atty.

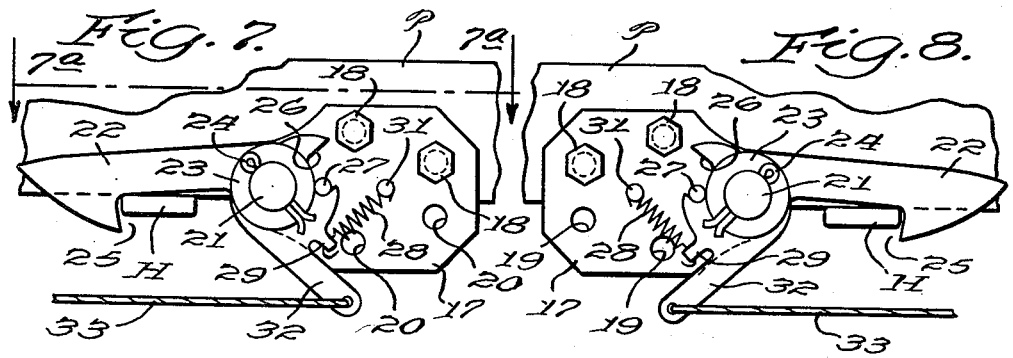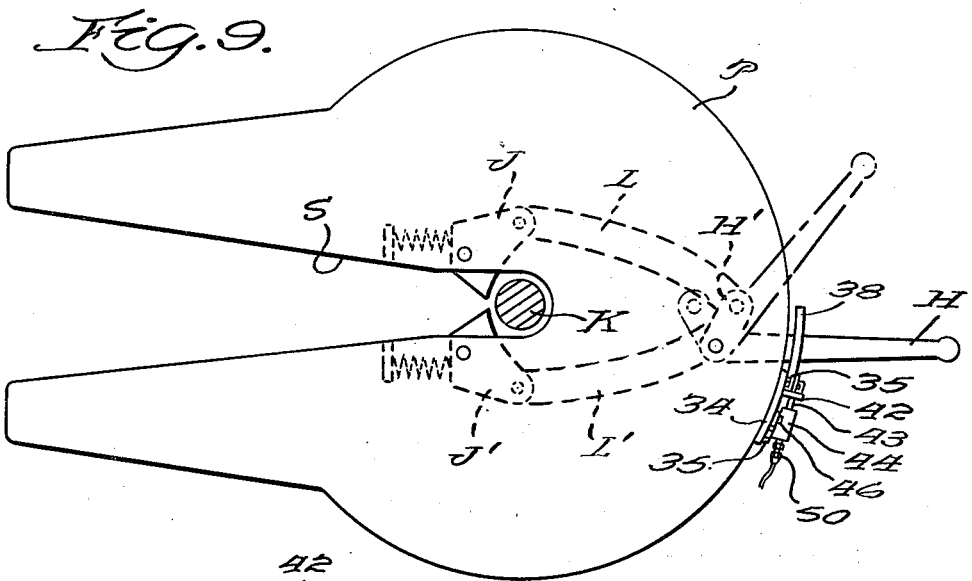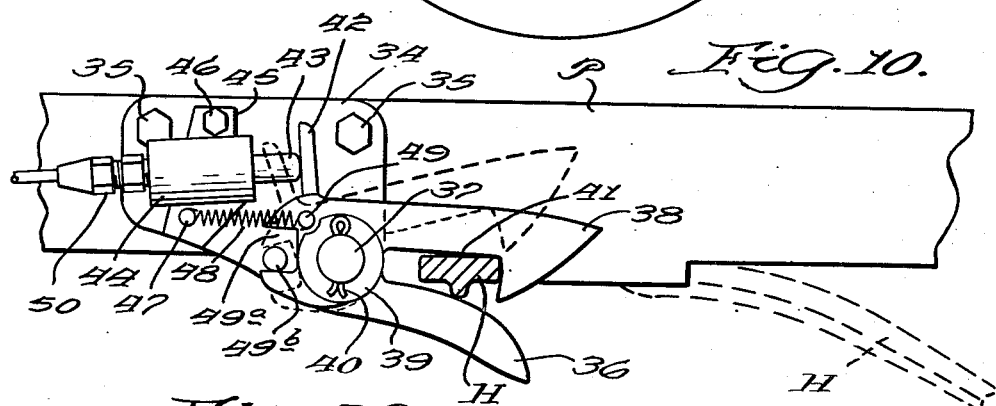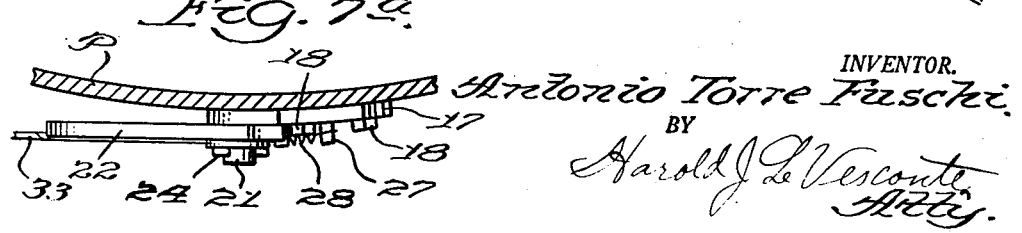

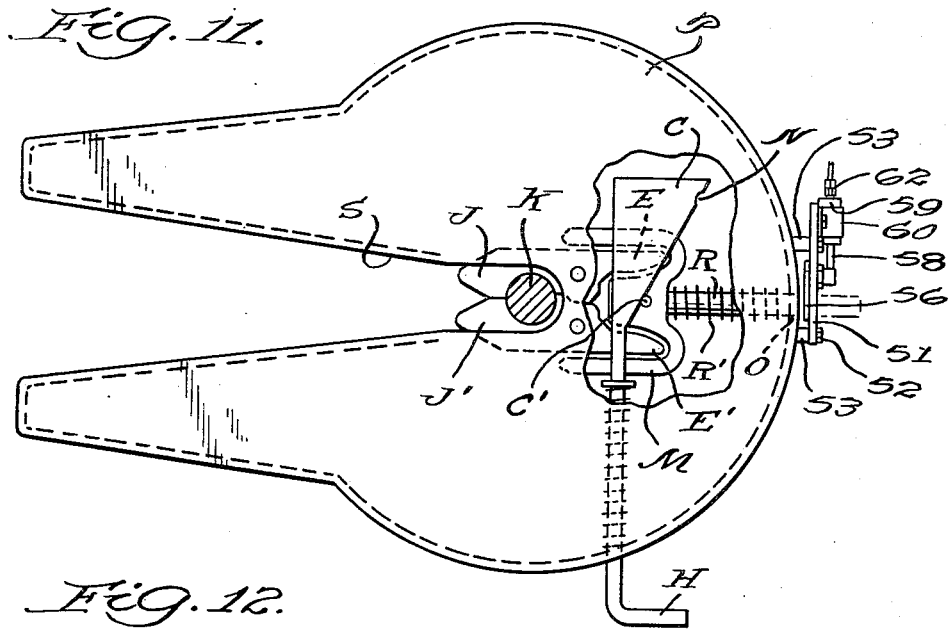
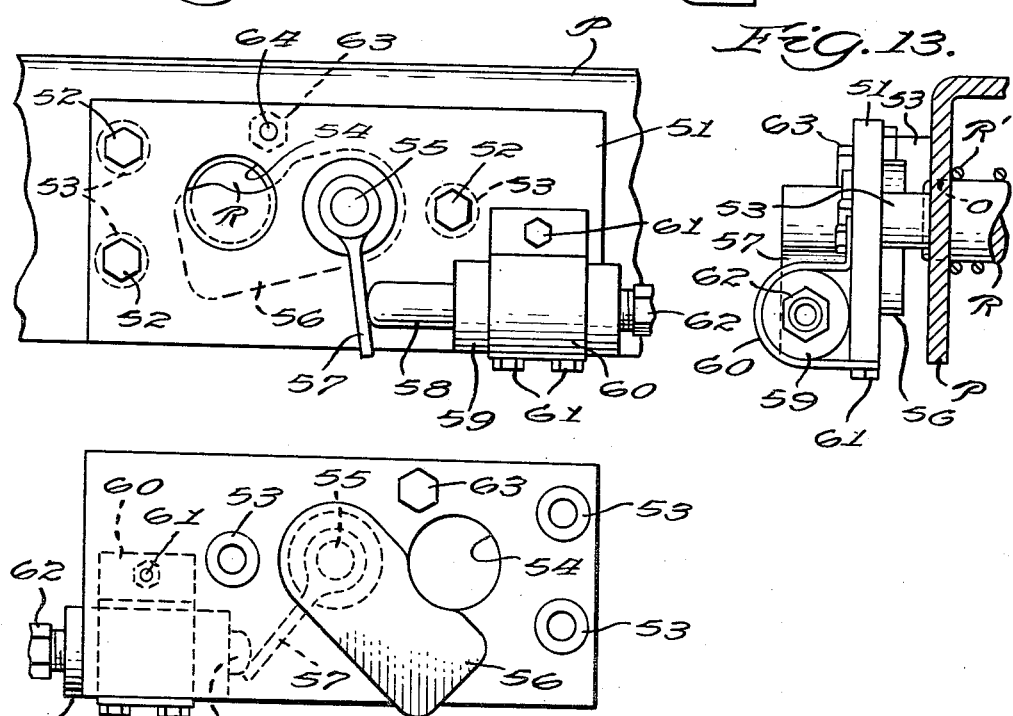
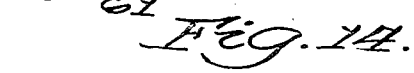

United States Patent Office 2,811,374
Patented Oct. 29, 1957

2,811,374

TRACTOR-TRAILER KING-PIN LOCK SAFETY MEANS

Antonio Torre Fuschi, Los Angeles, Calif.

Application March 28, 1955, Serial No. 497,239

11 Claims. (Cl. 280—432)

This invention relates to devices for coupling and uncoupling tractors and trailers and more particularly to a safety means for insuring against the accidental displacement of the means by which the trailer is locked to the tractor.

The principal object of the invention is to provide a locking means for the manually operated handle for actuating the king pin engaging jaw means against other than intentional movement to unlocking position.

Another object of the invention is to provide a handle locking means for the jaw operating handle of a tractor-trailer coupling means which is constructed and arranged to prevent movement of the handle to king pin releasing position so long as the trailer braking system is energized by the tractor.

A further object of the invention is to provide a manually operated handle locking means effective to prevent the movement of the king pin releasing handle without first disabling the handle locking means.

Still another object of the invention is to provide a brake pressure controlled handle locking means for locking the king pin releasing handle of a tractor-trailer coupling means which is constructed and arranged to be installed as an accessory to existing equipment without requiring change in the equipment to which it is applied.

A still further object of the invention is to provide a manually operated means for locking the king pin releasing handle of a tractor-trailer coupling means which is susceptible of being attached to existing equipment without change in the equipment and which, further, may be optionally installed for operation from either side of the equipment.

With the foregoing objects in view, together with such additional objects and advantages as may subsequently appear, the invention resides in the parts, and in the construction, combination and arrangement of parts described, by way of example, in the following specification of certain presently preferred embodiments of the invention by which the principles of the invention are applied to various, typical tractor-trailer coupling devices which are currently in wide general use, reference being had to the accompanying drawings, which form a part of said specification, and in which drawings:

Fig. 1 is a side elevation of a tractor-trailer combination depicted as a point of reference for Figs. 2, 9 and 11 and the other figures of the drawings dependent on said figures.

Fig. 2 is an enlarged top plan view taken on the line 2—2 of Fig. 1 and showing an embodiment of the invention applied to a trailer coupling means commonly known as "Fruehauf,"

Fig. 3 is a side elevation of Fig. 2,

Fig. 4 is a further enlarged front elevation of the locking means of the invention showing it in handle locking position, Fig. 5 is a still further enlarged front elevation showing the locking unit detached from the bolster plate structure and moved to handle releasing position, Fig. 6 is a still further enlarged medial sectional view of the actuating cylinder taken on the line 6—6 of Fig. 5, Fig. 7 is a front elevation of a manually operated embodiment of the invention arranged for operation from the left hand side of the trailer, Fig. 7a is a slightly reduced top plan view of the device shown in Fig. 7; the view being taken on the line 7a—7a thereof, Fig. 8 is a front elevation of the device shown in Fig. 7 arranged for operation from the right hand side of the trailer, Fig. 9 is a top plan view taken on the line 2—2 of Fig. 1 but showing an embodiment of the invention adapted for use with a coupling means known as "Trailmobile,"

Fig. 10 is a front elevation showing the embodiment of the invention of Fig. 9 in front elevation, Fig. 11 is a top plan view taken on the line 2—2 of Fig. 1 showing an embodiment of the invention to coupling equipment known as "Austin,"

Fig. 12 is an enlarged front elevation of the device shown in Fig. 11,

Fig. 13 is an elevational view from the right hand side of Fig. 12, and

Fig. 14 is a rear elevational view of the device shown in Fig. 12.

Referring to the drawings, Fig. 1 shows a tractor T connected to a trailer T′ and the tractor carries a transversely pivotally mounted bolster plate P. Referring next to Figs. 2, 9 and 11, the bolster plates are of generally similar configuration in plan and include a slot S extending medially from the rear end thereof in which the king pin K carried by the trailer is received. Each make of coupling means employs a different type of locking and releasing means for the king pin which will be referred to in detail as the various embodiments of the invention are specifically described; it being sufficient to mention at this point that each form employs a manually operable handle H for releasing the king pin incident to uncoupling of the tractor from the trailer.

Referring first specifically to Figs. 2 through 6, showing the application of the invention to "Fruehauf" coupling means, the king pin locking means operated by the handle H which is pivoted on a fulcrum F includes a hook like jaw element J which straddles the king pin by movement laterally of the slot S and thus secures the king pin in position at the end of the slot S. The handle H projects beyond the forward end of the bolster plate P for grasping by the operator and a tension spring S′ normally urges the handle and jaw element to released position. Heretofore, other means (not shown) have been employed to lock the handle and jaw element in locking position and the form of the invention now to be described comprises a means energized by the braking pressure effective to insure that the handle cannot be moved to releasing position so long as braking pressure is supplied to the trailer brakes by the tractor.

This form of the invention comprises a base plate 1 secured by bolts 2 to the front edge of the bolster plate P at the side of the handle position opposite the side to which it is moved in releasing the king pin. The base plate 1 carries a forwardly projecting pivot pin 3 carrying a hook member 4 secured thereon by a snap ring 4′ which projects horizontally across and below the position of the handle H when the latter is in locking position, said hook member terminating in an inclined outer camming face 5 leading to a handle retaining inner face 6. The hook element at the opposite side of the pivot pin 3 is provided with an arm portion 7 positioned to be contacted by the end of a piston rod 8 projecting from the end of a pressure cylinder 9 clamped to the base plate by a strap 10 and screws 11, 11. Within the cylinder 9 the piston rod 8 carries a piston head 12 provided with gasket means 13 slidably engaging the inner wall of the cylinder and the opposite end of the cylinder is provided with a fitting 14 by which it is connected to the trailer brake system for reception of braking pressure; said fitting being threaded into the cylinder end plug 15 which is threaded into the end of the cylinder 9. When subjected to pressure the piston is moved to the opposite end of the cylinder as shown in broken lines in Fig. 6 with resultant projection of the piston rod against the arm 7 and consequent movement of the hook element in a clockwise direction as viewed in Figs. 4 and 5 bringing the hook element up against the handle H to secure it from movement to releasing position. Upon release of pressure, the tension spring 16 extending between the base plate and the arm 7 will move the hook element in the opposite direction to permit the handle to be moved to releasing position either manually or by the spring S'. Thus, so long as the brake pressure lines are connected, the trailer cannot be uncoupled from the tractor.

Referring next to Figs. 7, 7a and 8, there is shown an embodiment of the invention comprising manually operable means for locking the king pin releasing handle on certain types of the said "Fruehauf" make of coupling means in which in some cases the handle is moved to the left as viewed from the front of the trailer (Fig. 7) or is moved to the right for release of the king pin (Fig. 8); both types being in common current use. In this form of the invention the base plate 17 is designed to be secured by bolts 18 to the front face of the bolster plate P; said bolts either passing through the holes 19 for attachment as arranged in Fig. 7 or through holes 20 for attachment as arranged in Fig. 8, the respective holes being the uppermost according to the positioning of the base plate. The base plate 17 adjacent one end edge thereof carries an outwardly projecting stud 21 on which a handle retaining hook element 22 is pivotally mounted and is retained thereon by a washer 23 and cotter pin 24. The stud 21 is disposed in the horizontal medial line of the base plate so that it will be in the same relative position to the lower edge of the bolster plate P in either installation of the base plate. The hook element is of uniform thickness and therefore may be installed upon the stud 21 in either position so that the handle retaining space 25 therein will be disposed above the handle H. The hook element is provided with a notch 26 at the side of the stud 21 opposite the hook portion thereof and the base plate 17 is provided with a stop pin element 27 disposed in the path of the opposite end faces of the notch 26; said pin being also disposed in the horizontal medial line of the base 17 wherefore, regardless of the manner in which the hook element is mounted on the stud 21, the movement of the hook element thereon will be limited to the same extents. A tension spring 28 has one end thereof connected to an arm 29 projecting laterally from the hook element below the notch 26 and the opposite end connected to a stud 31 projecting outwardly from the base plate in the medial centerline thereof; said spring thus being effective to urge the hook portion downwardly into engagement with the handle H to the extent permitted by the notch 26. The hook element is further provided with an arm 32 extending diagonally downwardly therefrom to which one end of a cable 33 is attached; the other end of the cable extending to the side of the trailer. By pulling on the cable, the user is enabled to lift the hook element from engagement with the handle; the end of the notch 26 serving by engagement with the stop pin 27 to limit the extent of lift.

Referring next to Figs. 9 and 10, a mode of application of the invention to trailer coupling equipment of the make known as "Trailmobile" is illustrated. In this coupling means the bolster plate P carries a pair of opposed pivotally mounted jaws J and J' which are connected by lines L and L' to the handle H at spaced points on the acutely angled portion H' thereof. As the king pin proceeds along the slot S incident to backing the tractor under the trailer, it contacts the inclined faces of the jaws forcing them apart on their pivots in opposition to the bias of the springs associated therewith and upon passing beyond the jaws, the springs return them to locking position. Incident to this movement the handle H moves from the full line position to the dotted line position and back to the full line position.

The illustrated embodiment of the invention for use with the above equipment comprises a base plate 34 secured to the front face of the plate P by bolts 35, 35. The base plate carries a laterally and slightly downwardly curved guide member 36 extending below the path of movement of the handle H which is effective to guide the handle into close proximity to the lower edge of the front face of the plate P as it returns to the full line or locking position. The base plate 34 also carries a forwardly projecting stud 37 on which a hook element 38 is mounted for oscillation and is secured thereon by a washer 39 and cotter pin 40. The hook element includes a handle engaging hook portion 41 extending over the handle when in locking position and with a vertically extending arm 42 positioned to be engaged by the piston rod 43 projectable from an air cylinder assembly 44 which is secured to the base plate 34 by a strap 45 having end portions secured to the base plate by a screw 46 and a rivet 47; the head of said rivet serving also as an anchorage for one end of a tension spring 48, the other end of which is connected to a pin 49 projecting outwardly from the hook element 38 and positioned thereon to cause the bias of said spring to constantly tend to move the hook element to handle releasing position in opposition to the bias applied by the piston rod 45. A notch 49a in the hook element engages opposite sides of a stop pin 49b to limit movement of the hook element in both directions. The end of the cylinder opposite the piston rod is provided with a fitting 50 by which it is connected to the braking pressure; the interior of the cylinder being similar to that disclosed in Fig. 6.

When the tractor is being coupled or uncoupled from the trailer, the break lines are disconnected and the spring 48 is free to move the hook element clear of the path of the handle H whether moved by the jaws J and J' incident to coupling or moved manually incident to coupling. When the brake lines are connected the cylinder 44 moves the hook element to the full line position shown in Fig. 10 with consequent locking of the handle H against displacement so long as the brake lines are connected and supplied with pressure.

Referring finally to Figs. 11 through 14, a mode of application of the invention to trailer coupling equipment of the make known as "Austin" is illustrated. In this form of coupling, the king pin engaging jaws J and J' are pivotally mounted on the bolster plate P. The jaws have forwardly extending portions E and E' which are engaged and held in locked position by a lock member M which is slidably mounted beneath the plate P and includes a rod R carrying a compression spring R' and reacting thereon between the rear face of the front flange of the plate P and the member M; the said front flange portion having an opening O through which the rod R projects incident to withdrawal of the member M from engagement with the jaw ends E and E'. The handle H is mounted for sliding movement transversely to the movement of the rod R and carries a cam member C engageable with a pin C' on the member M arranged so that pulling the handle outwardly from the side of the plate P effects the disengagement of the member M from the jaws leaving them free to open to receive and release the king pin. This movement of the member M and the attached rod R is accompanied by the projection of the end of the rod through the opening O in the plate P. The cam C also includes a notch N adapted to engage the pin C' and releasably lock the handle H and member M in withdrawn position.

The illustrated embodiment of the invention includes a base member 51 attached in spaced parallel relation to the front face of the plate by bolts 52 and ferrules 53 interposed between the base member and the plate and through which the bolts 52 extend; said base member having a hole 54 disposed in axial alignment with the opening O for reception of the rod R. Mounted for oscillation in the base member at one side of the hole 54 is a shaft 55 carrying an arm 56 at the side thereof adjacent the front face of the plate P which is movable from an upper position covering the hole 54 to a lower position clear of the hole 54. At the front face of the member 51 the shaft 55 carries an arm 57 positioned for engagement by the piston rod 58 of a cylinder assembly 59 of the type shown in Fig. 6; said cylinder assembly being secured to the base member 51 by a strap 60 and screws 61 engaging the front face and lower edge of the base member. A fitting 62 affords connection of the cylinder to the brake system and the head 63 of a screw 64 serves as a stop to limit the extent of upward movement of the arm 56.

When the trailer is coupled to the tractor and the brake lines are connected, pressure in the cylinder 59 will swing the arm 56 across the opening O and hole 54 thus preventing movement of the rod R therethrough and maintaining the jaws J and J' locked to the king pin. When the brake lines are disconnected, the weight of the arm 56 will cause it to move downwardly from its hole closing position thus affording clearance for movement of the rod R incident to manual locking or unlocking of the jaws. By placing the arm 56 at the rear face of the base plate, any pressure by the rod R thereagainst will be transmitted directly to the base member and the mounting bolts rather than producing a bending effect on the shaft 55 as would be the case if the arm were mounted on the front face of the base member.

Thus there has been provided a safety means which insures against accidental or unintentional release of the king pin locking means in tractor-trailer couplings. The showing of certain modes of execution of the invention as applied to certain existing types of coupling means is intended as showing that the principles of the invention are not limited to any specific coupling means but that they may be applied to any type including forms not here shown; the invention residing in the provision of locking means for the manually operated handle by which the coupling means is disengaged. Also as shown, the locking means may be either manually operated or it may be energized into handle locking position by the brake system pressure. With the foregoing considerations in mind, the invention is not to be deemed to be limited to the specific forms thereof illustrated and described as the best presently known modes of execution for the installations shown by way of example, and it will be understood that the invention embraces all such changes and modifications in the parts, and in the construction, combination and arrangement of parts as shall come within the purview of the appended claims.

I claim:

1. A safety means for tractor and trailer coupling devices of the type comprising a king pin carried by one of the vehicles and a bolster plate provided with king pin engaging means including manually operable means for releasing the king pin engaging means carried by the other vehicle, and a fluid pressure actuated braking system; said safety means comprising a movable element movable to and from a position obstructing movement of a member of the manually operable releasing means incident to movement of said member during a king pin releasing action, and devices connected to the braking system and operatively engaging said element effective to maintain said element in a position obstructing movement of the king pin releasing means at all times while the braking system is energized.

2. A safety means as claimed in claim 1 including a spring effective in absence of pressure in the braking system to move said element out of the path of movement of the king pin releasing means.

3. A safety means as claimed in claim 1 in which said devices operatively engaging said element comprises an air cylinder connected to the braking system of the vehicles and having a reciprocable piston engaging said element.

4. A safety means as claimed in claim 1 comprising a base member mounted on the bolster plate, an element pivotally mounted on said base plate and oscillable thereon into and out of a position obstructing movement of a member of the releasing means to be moved to releasing position, brake system actuated devices carried by said base plate and operatively engaging said element effective to move said element into said movement obstructing position, and other means separately constantly applying a bias to said element tending to move said element out of said movement obstructing position.

5. A safety means as claimed in claim 4 in which said devices for moving said element into movement obstructing position comprises a cylinder connected to the braking system of the vehicles, a piston reciprocable in said cylinder, and a piston rod carried by said piston and operatively engaging said element.

6. A safety means as claimed in claim 5 in which said element is separately engaged by spring means constantly applying a bias thereto tending to move said element in opposition to said piston rod.

7. A safety means as claimed in claim 4 in which said devices for moving said element into movement obstructing position comprises a tension spring having one end connected to said base and the other end thereof connected to said element.

8. A safety means as claimed in claim 4 in which said element comprises a hook having a face extending at right angles to the path of movement of the king pin releasing member when moving to releasing position.

9. A safety means for vehicle coupling means of the type comprising a king pin depending from one of the vehicles and receivable in a slot in a bolster plate carried by the other vehicle, king pin locking means disposed beneath the bolster plate, and a handle and devices operated thereby for unlocking the king pin; said safety means comprising a base plate mounted on the bolster plate, a pivotally mounted element carried by said base plate and movable into and out of a position obstructing movement of the unlocking means incident to unlocking the king pin, pressure responsive devices connected to the vehicle braking system effective upon energization of the braking system operatively connected to and effective to move said element into said movement obstructing position, and means effective upon disconnection of said pressure responsive means from the vehicle braking system to move said element out of said movement obstructing position.

10. A safety means for vehicle coupling means of the type comprising a king pin depending from one vehicle and receivable in a slot in a bolster plate carried by the other vehicle, king pin locking means disposed beneath the bolster plate, unlocking devices disposed beneath the bolster plate including a manually operable handle and a rod projectable through an opening in the front wall of the bolster plate incident to movement to king pin unlocking position; said safety means comprising an element pivotally mounted adjacent one side of the opening through which the rod projects and movable between positions covering and uncovering the opening, and devices connected to the vehicle braking system effective upon energization of the system to move said element to cover the opening with resultant locking of said king pin unlocking means against movement to unlocking position.

11. A safety means for tractor and trailer coupling devices of the type comprising a king pin depending from the trailer, a bolster plate on the tractor having manually releasable king pin locking devices including an operating handle, and a fluid pressure operated braking system for the connected vehicles; said safety means comprising an operating handle engaging means effective to prevent movement of the handle to king pin releasing position when the braking system is energized and including a base plate mounted on the bolster plate adjacent to the path of movement of the handle, a hook element pivotally mounted on said base plate and movable thereon between a position out of said path and a position in said path, fluid pressure responsive means carried by said base plate and connected to the braking system effective upon energization of the braking system to hold said hook element yieldingly in said path, and a spring connected to said hook element normally urging said hook out of said path when said fluid pressure responsive means is not subject to braking system pressure; said hook element having a sloping face disposed to be engaged by the handle incident to movement of the handle into king pin engagement with resultant momentary downward displacement of the hook element against the resistance offered by said fluid pressure responsive means and further having a face extending at right angles to the handle effective to prevent movement of the handle to king pin releasing position while the braking system is energized.

References Cited in the file of this patent

UNITED STATES PATENTS

| | | |
|---|---|---|
| 1,966,839 | Walker et al. | July 17, 1934 |
| 1,996,425 | Ketel | Apr. 2, 1935 |
| 2,426,002 | DenBesten et al. | Aug. 19, 1947 |
| 2,440,152 | Norman et al. | Apr. 20, 1948 |
| 2,471,854 | Bies et al. | May 31, 1949 |
| 2,623,753 | Madigan | Dec. 30, 1952 |
| 2,726,878 | Fontaine | Dec. 13, 1955 |